Jan. 5, 1965 T. H. NICHOLL 3,164,801
AERIAL DELIVERY WIND AND LOCATION SIGNAL DEVICE
Filed March 19, 1962
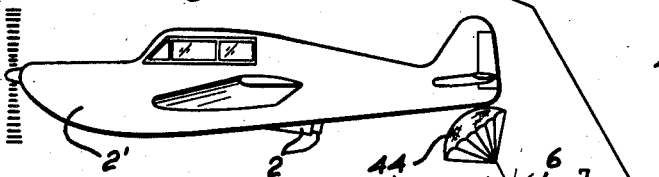
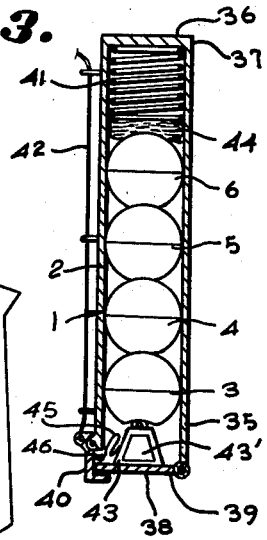
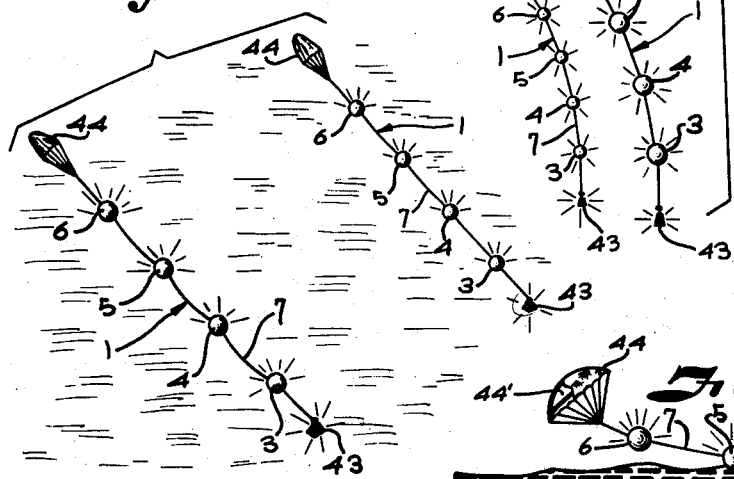
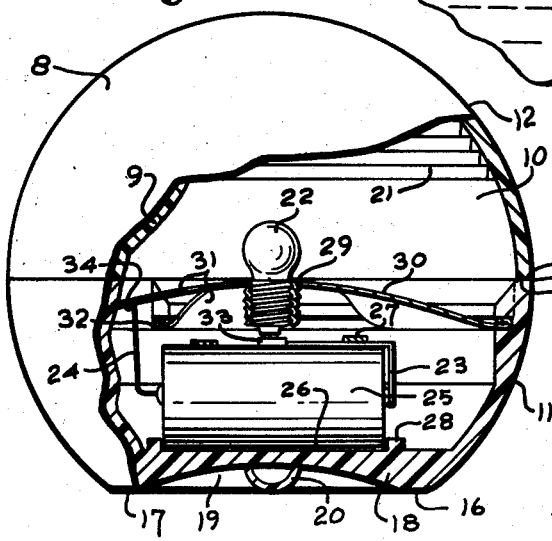
INVENTOR.
THOMAS H. NICHOLL
BY
Fishburn and Gold
ATTORNEYS

United States Patent Office 3,164,801
Patented Jan. 5, 1965

3,164,801
AERIAL DELIVERY WIND AND LOCATION
SIGNAL DEVICE
Thomas H. Nicholl, 9935 High Drive, Leawood, Kans.
Filed Mar. 19, 1962, Ser. No. 180,482
5 Claims. (Cl. 340—25)

This invention relates to an aerial delivery wind and location signal device, and more particularly to a device adapted to be discharged from a flying aircraft for the purpose of indicating ground wind direction, and to judge height and location above ground or water.

The principal objects of the present invention are to provide a device for use with flying aircraft to effectively indicate the height above ground and the direction of ground wind currents, information required for landing; to provide an indicator which is not connected with the aircraft and yet provides useful information for the use of the pilot; to provide such a signal device which may be discharged from a flying aircraft and retrieved after landing; to provide such a signalling device which is effective at night as well as during the daylight; to provide a wind direction signal mechanism which includes illuminating devices which automatically actuate upon release for dropping same to the ground; to provide such a device having a high volume to weight ratio for producing a retarded rate of fall and causing said device to react to wind forces by assuming a linear configuration pointed downwind upon contact with the ground; to provide such a device which is operable either on land or on water; to provide a signal device having a plurality of spaced connected members associated with various illuminating means including a flare and a blinker; to provide a container for use in an aircraft for holding said device and having propelling means whereby the illuminating means are held in de-energized position until the device is discharged from said container; to provide such a signalling mechanism wherein certain of the illuminating devices associated therewith are momentarily deactuated upon ground contact whereby the pilot may estimate altitude from a knowledge of the rate of fall thereof; and to provide such a device which is simple in construction and highly reliable in use.

Further features and advantages of this invention will appear from the following description taken in connection with the accompanying drawings wherein are set forth by way of illustration and example certain embodiments of this invention.

FIG. 1 is a view in side elevation showing a pair of signalling devices as they are discharged from a flying aircraft.

FIG. 2 is a perspective view showing the linear configuration assumed by the signalling devices upon contact with the ground.

FIG. 3 is a sectional view of a discharging container for a signalling device.

FIG. 4 is a sectional view through a body of water indicating the downwind configuration taken by a device when dropped thereon.

FIG. 5 is a view in side elevation on an enlarged scale of a signal marker with a portion broken away to show the illuminating assembly therein.

Referring to the drawings in more detail:

The reference numeral 1 indicates generally the signal device of this invention. A pair of devices 1 are illustrated in FIG. 1 as they are being discharged from a pair of containers 2 on a flying aircraft 2′ for the purpose of indicating the direction of ground wind currents and height of the plane above the ground to the pilot. The devices 1 each include a series of light weight signal markers 3, 4, 5 and 6 having a definite spacing therebetween and joined in a unitary linear group by means of an elongated flexible tie rope or wire 7.

An example of a suitable marker is shown in FIG. 5 and comprises a body or hollow member 8 having walls 9 forming a casing defining a closed chamber 10. In the illustrated structure, the hollow member 8 includes a lower shell section 11 and an upper shell section 12 arranged with abutting faces 13 and 14 respectively suitably joined together with suitable adhesives, heat sealing or the like to form a watertight joint 15. The hollow member 8 is preferably substantially spherical in shape and is weighted to be self-righting upon contact with a substantially level surface. In the structure illustrated, the lower section 11 has a flattened portion 16 defining a bottom surface 17 lying in a plane normal to a radius of the hollow member 8 whereby a substantially level surface is adapted to support the marker in an upright position. The lower section 11 has a bottom wall 18 which is preferably provided with a concavity 19 extending upwardly therein from the surface 17 whereby said surface 17 is in the form of a ring. An eye member 20 is suitably secured to the bottom wall 18 within the concavity 19 to provide a suitable anchor or fastening means for the tie rope or wire 7.

The walls 9 are preferably of resilient elastic shock-resistant translucent or transparent material, for example, synthetic resin such as polyethylene, polyvinyl chloride, or other resilient flexible material. Ribs 21 may be provided on the interior of the upper section 12 to act as suitable light-directing elements or lenses whereby light originating from the interior of the chamber 10 will be best visible from directly above the device when it is resting with the flattened portion 16 against a substantially horizontal surface. The lens effect of the ribs 21 permits the pilot to determine wind direction with more accuracy by noting position when directly thereabove.

The upper section 12 is also preferably brightly colored and each of the markers 3, 4, 5 and 6 preferably are a different color whereby the pilot will be able to readily ascertain the downwind from the upwind direction by the order of the different color markers in a line on the ground.

It is desirable that the chamber 10 be airtight whereby a suitable gas may be placed in the chamber under pressure to assure that the walls 9 return to their normal spherical shape in the event that they are deformed inwardly upon contact with the ground. The gas used is preferably inert and dry in order to tend to reduce or eliminate corrosion of otherwise corrodible parts contained in the chamber 10 and described hereinafter. Such a gas may be carbon dioxide, nitrogen, helium, or other relatively inert gases. A suitable pressure of the gas in the chamber 10 is two pounds per square inch above atmospheric at sea level.

An electric lamp 22 is arranged in the chamber 10 preferably near the vertical axial center of the hollow member 8 and is adapted to be connected in an electrical circuit completed through wires 23 and 24 and supplied with energy by means of a battery 25 connected with the wires 23 and 24. The battery 25 is preferably supported adjacent the bottom wall 18 to provide additional weight in the lower section 11 whereby the center of gravity of the hollow member 8 is well below the spherical center to urge same upright when it comes to rest on land or in water. In the structure illustrated in FIG. 5, the battery 25 rests in a recess or saddle-forming portion 26 extending upwardly from the bottom wall 18. Suitable fastening devices such as straps 27 retain the battery 25 in place. The ends of the saddle portion 26 have upstanding flanges or lugs 28 to limit longitudinal movement of the battery 25.

The electric lamp 22 is secured in a socket 29 integral with a spider 30 formed of resilient material such as spring metal and having legs 31 retained in slots 32 formed in the walls 9 of the lower section 11. Additional details regarding the construction of the spider 30 and formation of the slots 32 may be found in my co-pending application, Serial No. 67,599, filed November 7, 1960, for "Emergency Signal Lamp Device."

As noted in the above-named application, the spider 30 may be coated with a reflective material to increase the intensity of emitted light from the device. Also, the spider 30 is formed in a dish or dome shape whereby the spring action thereof causes same to be biased to urge the electric lamp 22 into contact with a terminal 33 electrically connected with the wire 23. In the structure illustrated in FIG. 5, the electric wire 24 is soldered to the spider 30 at 34 to complete the circuit to the electric lamp 22.

The configuration described above causes a normal completion of the circuit between the battery 25 and the electric lamp 22. However, inward pressure on the sides of the hollow member 8, for example in the vicinity of the joint 15, will cause the spider 30 to act as a switch and bow upwardly separating the terminal 33 from the electric lamp 22 and breaking the circuit. It is desirable that a selected marker blink for further indication of position with respect to the other markers. For this purpose, the spider 30 may be formed of a heat expansible material for periodically breaking the contact between the lamp 22 and the terminal 33 after which it will cool and re-establish contact.

It is to be understood that the markers 3, 4, 5 and 6 may be stored in a container or clamping member which produces such inward pressure whereby the circuit is interrupted until the device is released for use, at which time the electric lamp 22 is automatically energized.

An example of a suitable discharge container is shown in FIG. 3 and comrises an elongated cylindrical tubular member 35 having a fixed wall 36 closing one end 37 thereof and a lid 38 hinged to the member 35 and selectively closing the other end 39 thereof. A trigger latch 40 is hingedly secured to the member 35 and is positioned to engage the lid 38 to selectively maintain same in a closed position. The signal device 1 is contained in the member 35 with the markers 3 to 6 inclusive compressed as described above to maintain the lamp 22 inoperative. A helical spring 41 is retained in the compressed condition between the device 1 and the wall 36 and is adapted to urge the device 1 out of the container upon release of the lid 38. The container is suitably secured to the aircraft 2' in a convenient location such as the underside thereof and a release cable 42 is attached to the trigger latch 40. The cable 42 terminates in a convenient location (not shown) preferably near the pilot controls (not shown) whereby the device 1 may be discharged with a signal originating at a point remote from the container.

A weight member 43 containing a flare 43' is connected to one end of the tie rope or wire 7 to provide an unbalanced system tending to fall with the weight 43 foremost. To augment the unbalance, a descent retarder such as a parachute 44 may be connected to the other end of the tie rope or wire 7 whereby the device 1 exhibits the weight member 43 at one end, the parachute 44 at the other end, and the markers 3, 4, 5 and 6 spaced therebetween. It is desirable that the parachute 44 is of a type which is self-supporting after opening whereby it will continue to produce a downwind drag when in contact with the ground or water. An air space 44' is provided in the parachute 44 to maintain the buoyancy thereof when on water. The flare 43' has a pull string 45 secured to a suitable anchor 46 on the container 2 and adapted to actuate the flare upon discharge of the device 1 to light the terrain on descent.

In use, the device 1 is discharged singly or in pairs from the containers 2, as noted above. The weight member 43, cooperating with the lightweight markers 3, 4, 5 and 6 and the parachute 44, causes the device to assume a linear configuration as it falls to the ground below. The weight member 43 will strike the ground first and the markers and parachute will trail therebehind and on landing be positioned in a line downwind from the weight member to form a self-illuminated signal indicating wind direction. Distance of the aircraft above the ground may be estimated by noting the apparent spacing between the respective markers. When discharged in pairs, the devices 1 may act as landing strip markers for subsequently arriving aircraft desiring to land in the same location, FIG. 2. In the event that the device is desired to be used over water, the initial contact with the water will be in a line indicating wind direction, FIG. 4, and the device will remain in this line due to wind action against the parachute 44.

The device 1 has a relatively low or retarded rate of fall. When the device 1 initially strikes the ground, the markers 3, 4, 5 and 6 will in practically all cases contact the ground in a manner whereby inward forces are produced against the walls 9 in the vicinity of the joint 15 whereby the illumination of the electric lamp 22 will be momentarily interrupted to notify the pilot that landing of the device has occurred. If desired, the pilot may time the falling period of the device and, knowing the approximate rate of fall and moment of contact, may calculate the altitude from which the device was dropped. As noted above, the markers 3, 4, 5 and 6 are of different colors and selected markers may blink whereby the downwind direction may be positively indicated by the relative positions of the ends of the series of markers. It is also desirable that one or more of the markers be brightly iridescent whereby the device may be easily spotted on the ground in daylight.

I wish it to be understood that I do not desire to be limited to the exact details of construction shown and described, for obvious modifications will occur to a person skilled in the art.

What I claim and desire to secure by Letters Patent is:

1. An aerial delivery wind and location signal device which is discharged from a flying aircraft and lowered to a surface with the disposition on said surface indicating wind direction comprising, an elongated flexible member, a weight member secured to said flexible member at one end thereof, a descent retarder connected to the other end of said flexible member, a plurality of lightweight markers spaced along the length of said elongate flexible member and connected thereto with said descent retarder, weight and markers each spaced apart from the others when said flexible member has a linear position, said markers being hollow bodies with thin resilient walls, and means in said markers enhancing the visibility thereof, said device upon release from an aircraft being lowered to the ground with the weight landing first and the markers and descent retarder in accordance with their spacing from the weight trailing and landing in sequence substantially downwind from said weight to form a signal indicating wind direction.

2. An aerial delivery wind and location signal device as set forth in claim 1 wherein the means for enhancing the visibility of the markers consists of an electric circuit including a source of electric current, an electric illuminating means in each markers, switch means in said circuit actuated by movement of the resilient marker wall, said switch being normally in circuit-making position and interrupting the circuit on inward disposition of said marker wall.

3. An aerial delivery wind and location signal device as set forth in claim 2 wherein the switch in the electric circuit is responsive to deformation of the resilient marker wall and is actuated by impact of said wall against a surface in landing to momentarily interrupt the circuit to the illuminating means.

4. An aerial delivery wind and location signal device as set forth in claim 2 in combination with a container for containing said markers, said container having means engaging said marker walls for deforming same and actuating the switch to interrupt the circuit to said illuminating means while the markers are positioned therein, and propulsion means in said container for discharging said markers from said container.

5. An aerial delivery wind and location signal device as set forth in claim 1 wherein the descent retarder is a parachute having shroud lines connected to said other end of said elongated flexible member and the spacing of said parachute, markers and weight provides an over-all substantial known length to facilitate estimation of altitude of the aircraft thereabove.

References Cited by the Examiner
UNITED STATES PATENTS

| | | | |
|---|---|---|---|
| 693,855 | 2/02 | Gherassimoff | 340—61 |
| 2,376,330 | 5/45 | Dircksen et al. | 340—366 |
| 2,831,967 | 4/58 | Bayze | 340—366 |
| 2,850,716 | 9/58 | Smale | 340—366 |
| 2,880,405 | 3/59 | Lerman | 340—45 |

NEIL C. REID, *Primary Examiner.*

ROBERT H. ROSE, *Examiner.*